United States Patent
Fert et al.

(10) Patent No.: US 6,411,738 B2
(45) Date of Patent: *Jun. 25, 2002

(54) VARIABLE BITRATE VIDEO CODING METHOD AND CORRESPONDING VIDEO CODER

(75) Inventors: Etienne Fert, Paris (FR); Daniel Kaiser, Kir CH-Goens Butzbac (DE)

(73) Assignee: U.S. Philips Corporation, New York, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/124,674

(22) Filed: Jul. 29, 1998

(30) Foreign Application Priority Data

Jul. 29, 1997 (EP) .............................. 97401823
Mar. 3, 1998 (EP) .............................. 98400503

(51) Int. Cl.⁷ ................................................. G06K 9/36
(52) U.S. Cl. ..................................... 382/239; 348/404.1
(58) Field of Search .................. 382/239; 348/404, 348/405, 419; 358/261.2, 430; 341/51

(56) References Cited

U.S. PATENT DOCUMENTS

| | | | | |
|---|---|---|---|---|
| 5,263,100 A | * | 11/1993 | Kim et al. .................. | 382/166 |
| 5,265,180 A | * | 11/1993 | Golin .......................... | 382/236 |
| 5,687,257 A | * | 11/1997 | Paik et al. ................... | 382/239 |
| 5,692,074 A | * | 11/1997 | Kunitake ..................... | 382/239 |
| 5,719,632 A | * | 2/1998 | Hoang et al. .......... | 375/240.05 |
| 5,929,916 A | * | 7/1999 | Legall et al. .......... | 375/240.05 |
| 5,963,673 A | * | 10/1999 | Kodama et al. ............ | 382/239 |

FOREIGN PATENT DOCUMENTS

WO  9716029 A1  5/1997

OTHER PUBLICATIONS

"MPEG Video Coding: A Basic Tutorial Introduction", By S.R. Ely, in Research and Development Report, 1996, pp. 1–10.

"Hybrid Extended MPEG Video Coding Algorithm for General Video Applications", by Cheng–Tie Chen Et Al., Signal Processing: Image Communications, vol. 5, 1993, pp. 21–37.

\* cited by examiner

*Primary Examiner*—Yon J. Couso
(74) *Attorney, Agent, or Firm*—Russell Gross

(57) ABSTRACT

The variable bitrate coding method according to the invention comprises an iterative process including a first coding pass and a second prediction pass. The coding pass allows for a picture coding of a sequence with a constant quantization stepsize (and quality) and the prediction pass allows for a matching of the stepsize to the wanted target bitrate. After some iterations, a last step allows for a finer adjustment of said stepsize with respect to said target bitrate.

2 Claims, 3 Drawing Sheets

VARIABLE BITRATE VIDEO CODING METHOD AND CORRESPONDING VIDEO CODER

BACKGROUND OF THE INVENTION

The present invention relates to a variable bitrate video coding method and to a corresponding video coder allowing to carry out said method.

As described in the document << MPEG Video coding: a basic tutorial introduction>>, S. R. Ely, BBC Research and Development Report, BBC-RD-1996/3, pp.1–10, MPEG activities started in 1988 with the aim of defining standards for digital compression of video and audio signals. The first goal was to define a video algorithm for digital storage media such as the CD-ROM (Compact Disc Read-Only Memory), but the resulting standard was also applied in the Interactive CD system (CD-I). Allowing transmission and storage of picture data at bit rates in the range of 1 to 15 Mbits/s, this standard is based on a data compression achieved by using a block-based motion compensation for the reduction of the temporal redundancy and a discrete cosine transformation (DCT) for the reduction of the spatial redundancy.

With conventional CD standards such as CD-I and CD-ROM, the transmission bit rate is fixed and pictures can therefore only be coded at a constant bit rate. New standards such as the Digital Versatile Disc (DVD) allow for transmission of data at a variable bit rate (VBR): complex scenes can be coded at a higher bitrate than scenes containing less information, in order to maintain a constant quality.

SUMMARY OF THE INVENTION

An object of the invention is to propose a VBR video coding method allowing to obtain such a constant quality of the coded sequence, but under the constraint of a given total bit budget (i.e. according to a predetermined target bitrate).

To this end the invention relates to a VBR video coding method characterized in that it comprises:
(a) an coding step, for coding a picture sequence with a constant quantization step and generating a bitstream for which the average bit rate of the sequence does not fulfil necessarily a required constraint of a specific size;
(b) a prediction step, for predicting the quantization stepsize which must be used to code the bitstream according to a predetermined target bit rate;
(c) at least one repetition of said analysis and prediction steps in order to get a more precise estimation of said stepsize;
(d) a final control step, relying on a comparison of the cumulative bit rate for all previous frames with the cumulative predicted bit rate, in view of an adjustment of the stepsize so that said target bit rate is matched.

Another object of the invention is to propose a VBR video coder provided for implementing said coding method.

To this end the invention relates to a variable bit rate video coder characterized in that it comprises:
(a) a coding branch, including in series at least a quantization circuit and a variable length circuit;
(b) a prediction branch, including in series at the output of said quantization device at least an inverse quantization device and a prediction sub-system and defining by subtraction the signal to be coded by said coding branch;
(c) a control circuit provided for carrying out the implementation of the following operations:
 a coding operation of a video sequence with a constant quantization stepsize;
 a prediction operation for an estimation of a quantization stepsize allowing to code the bitstream with a specified target bitrate;
 at least one repetition of said operations;
 a final controlling operation in order to match the total number of bits spent during the coding operation to said target bitrate.

BRIEF DESCRIPTION OF THE DRAWINGS

The advantages of the invention will now be shown in relation with the following description and the accompanying drawings, in which.

Before describing the coding method according to the invention, some basic principles of the MPEG-2 video standard may be recalled. The flexibility of this standard, intended to support a wide range of possible applications, is obtained thanks to the definition of profiles and levels allowing to suit all of the application requirements. A profile is a subset of the MPEG-2 standard intended to support only the features needed by a given class of application, while a level defines a set of imposed constraints on parameters of the bitstream.

The basic steps of the MPEG-2 compression, applied to colour pictures consisting of three components (Y,U,V), concern frames that are divided into small subsections, or macroblocks, themselves consisting of luminance and chrominance blocks. These steps are: motion estimation and compensation (based on 16 pixels×16 lines macroblocks), discrete cosine transformation (based on 8 pixels×8 lines blocks), run-length coding.

Three types of frames, or pictures, are defined. Intra pictures (or I pictures) are coded without reference to other pictures, predictive pictures (or P pictures) are coded using a motion-compensated prediction from a past I or P picture, and bidirectional-predictive pictures (or B pictures) use both past and future I or P pictures for motion compensation. The motion information is given in the form of motion vectors obtained by implementation of a block-matching search (in which a large number of trial offsets are tested in the coder and the best one is selected on the basis of a measurement of the minimum error between the block being coded and the prediction).

DETAILED DESCRIPTION OF THE PREFERRED EMBODIMENTS

Figure 1:
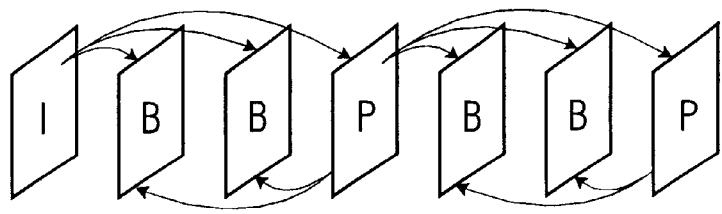
FIG. 1 shows some pictures of a group of pictures.

As indicated in FIG. 1 that illustrates how, on the basis of the motion vectors, the P and B pictures are defined, the different pictures typically occur in a repeating sequence which is termed a group of pictures, or GOP, and consists of an I picture and all succeeding pictures until the next I picture occurs. A typical GOP is shown in display order in FIG. 2 (the black arrows correspond to forward predictions and the white ones to backward predictions, the sequences and the predictions repeating periodically) and in transmission order in FIG. 3 (P4, P7, I10, P13 designate the re-ordered frames), said orders being different to enable at the decoding side backward predictions from future pictures.

Figure 2:
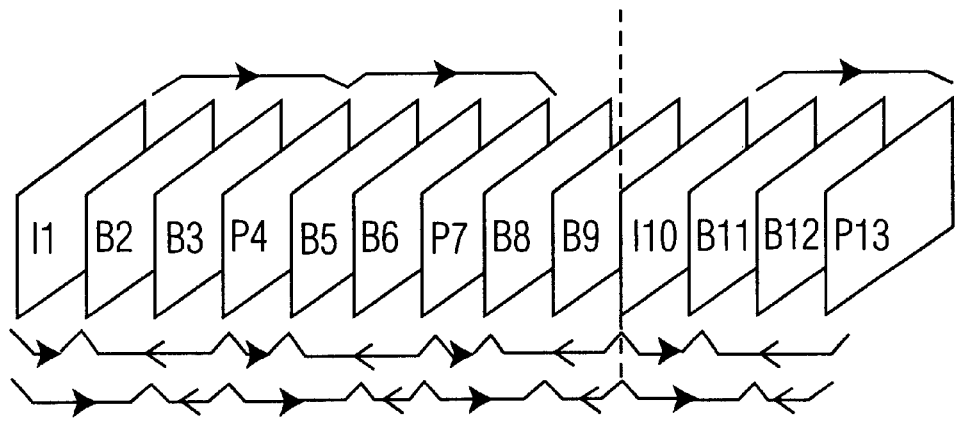
FIGS. 2 and 3 illustrate for such a typical group of pictures the difference between the display order of the pictures and their transmission order.
Figure 3:
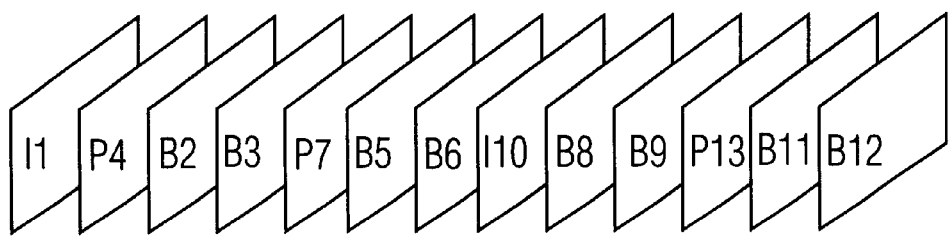

A regular GOP structure can be described with two parameters, N and M. The parameter N, defined as the size of a GOP, is, as shown in FIG. 2, the number of pictures of said GOP, i.e. the number of pictures between two I pictures plus one. The parameter M is the spacing of P pictures, or (which is the same) the number of adjacent B pictures plus one. In the illustrated example of FIGS. 1 to 3, M=3 and N=9. Obviously other combinations are possible:

| Picture display order | N | M |
|---|---|---|
| IPPPPPIPP | 6 | 1 |
| IBPBPBPBI | 8 | 2 |
| IBBPBBPBBPBBIBBP | 12 | 3 |

N and M being chosen independently from each other.

After a decision about the kind of macroblock compensation has been taken, the prediction error for each pixel of the concerned macroblock is obtained by subtracting the estimated macroblock from the original one. A DCT is then performed on the prediction error, for a block of 8×8 pixels (hence six DCT transforms are determined for each macroblock: four for the luminance component, two for the chrominance components), and the frequency components thus obtained are quantized. The quantization stepsize determines the bitrate and the distorsion of the decoded image: if the quantization is coarse, few bits are needed to code a picture, but the final quality is low, while, if the quantization stepsize is fine, many bits are needed to code the picture, but the quality is high. As the human eye is less sensible to the higher frequencies than to the lower ones, it is advantageous to use coarser quantizers for the high frequency components (in fact, in order to achieve the frequency dependent quantization, a weighting matrix is applied to a basic macroblock quantization parameter: a lot of coefficients, especially those at high frequencies, is equal to 0 after said weighted quantization).

Each block is then zigzag scanned and the obtained list is coded. The run-length coding is done by determining a pair (A, NZ) where A designates the number of consecutive zeros (0 to 63) and NZ the amplitude of the following non-zero coefficient. A variable length code is then assigned to this pair (A,NZ), depending on the frequency of occurrence of this pair (a combination (A,NZ) which is common is assigned a short variable length code, whereas a pair which is less frequent is assigned a long one).

Figure 4:
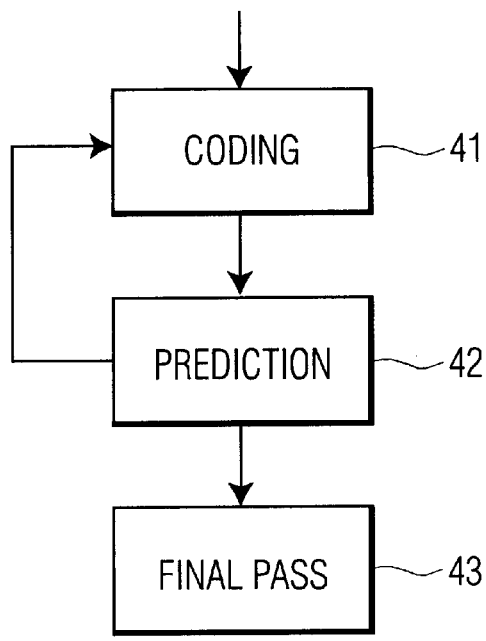
FIGS. 4 and 5 show respectively the main steps of the coding method according to the invention and a corresponding architecture of video coder allowing to implement said method
Figure 5:
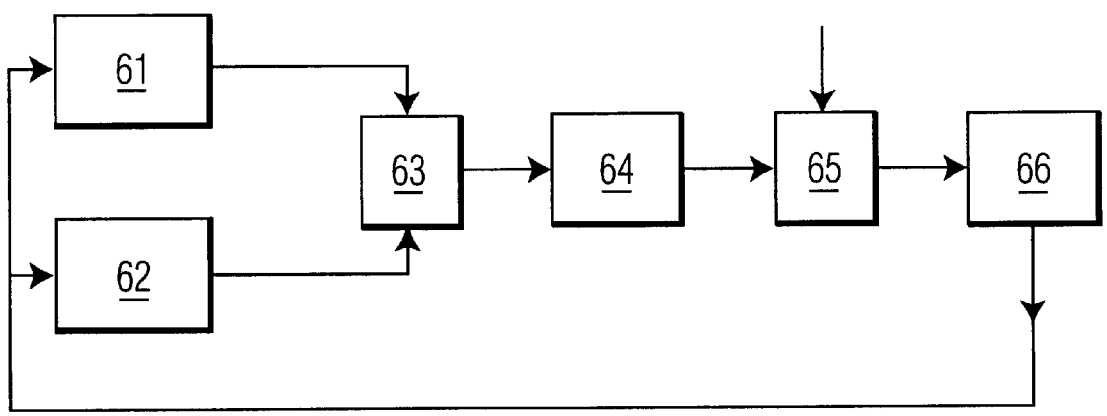

The functions hereabove described are summarized for example in the document <<Hybrid extended MPEG video coding algorithm for general video applications >>, C. T. Chen and al., Signal Processing: Image Communication 5 (1993), pp.21–37, part 2.4, which includes the scheme of a generalized MPEG-2 coder. The aim of the VBR coding method now proposed is to guarantee that the size of the final bitstream will fit exactly on a storage medium with a fixed capacity like a DVD. A diagram of said method is given in FIG. 4, and an architecture of video coder allowing to implement said method is illustrated in FIG. 5.

The coding method is divided into three steps 41, 42 and 43. The first step 41 is coding one, in which a picture sequence is coded with a constant quantization stepsize Qc (and therefore with a constant quality). At the end of this step, a regular MPEG-2 compliant bit stream has been generated, but the average bit rate of the whole sequence thus processed (i.e. the quotient of the total number of coded bits over the sequence by the total number of pictures in that sequence), unknown before the end of said step, does not fulfil the required constraint of a specific size of the bitstream.

The second step 42 is a prediction one, intended to predict the quantization stepsize Q which must be used to code the bistream according to the specified target bit rate. Once said prediction step is completed, the coding step 41 may be repeated (arrow in FIG. 4) as often as necessary in order to get a more precise estimation for Q (however, a good prediction is generally obtained after a few runs, for instance two).

As the quantization stepsize Q available at the end of this second step is only an estimated value, the total bit budget is not exactly matched if every picture is coded by using said predicted value. The last step is a final pass 43 that allows to guarantee that the constraint on the total average bit rate is strictly observed. To ensure that the final output bitstream has indeed exactly the desired size, a quantization stepsize control process is implemented. This process is based on a control loop relying on a comparison of predicted and real bit rates. After the coding of each picture in the final step, the control process compares the total number of bits that have been spent with the allowed one. If more bits have been spent than the budget allows, the quantization stepsize is increased, and the bit rate of the following pictures is reduced. If fewer bits have been spent than the budget allows, Q is decreased and the bit rate is increased, the total target bit rate being finally exactly matched.

Said VBR coding method is implemented in the coder of FIG. 5, where each block corresponds to a particular function that is performed under the supervision of a controller 55. The illustrated coder comprises in series an input buffer 51, a subtractor 549, a DCT circuit 521, a quantization circuit 522, a variable length coding circuit 523, and an output buffer 524. The circuits 521 to 524 constitute the main elements of a coding branch 52, to which a prediction branch 53, including an inverse quantization circuit 531, an inverse DCT circuit 532 and a prediction sub-system, is associated. This prediction sub-system itself comprises an adder 541, a buffer 542, a motion estimation circuit 543 (said estimation is based on an analysis of the input signals available at the output of the buffer 51), a motion compensation circuit 544 (the output signals of which are sent backwards to the second input of the adder 541), and the subtracter 549 (receiving both output signals of the buffer 51 and output signals of the motion compensation circuit 544, for sending their difference towards the coding branch).

Figure 6:
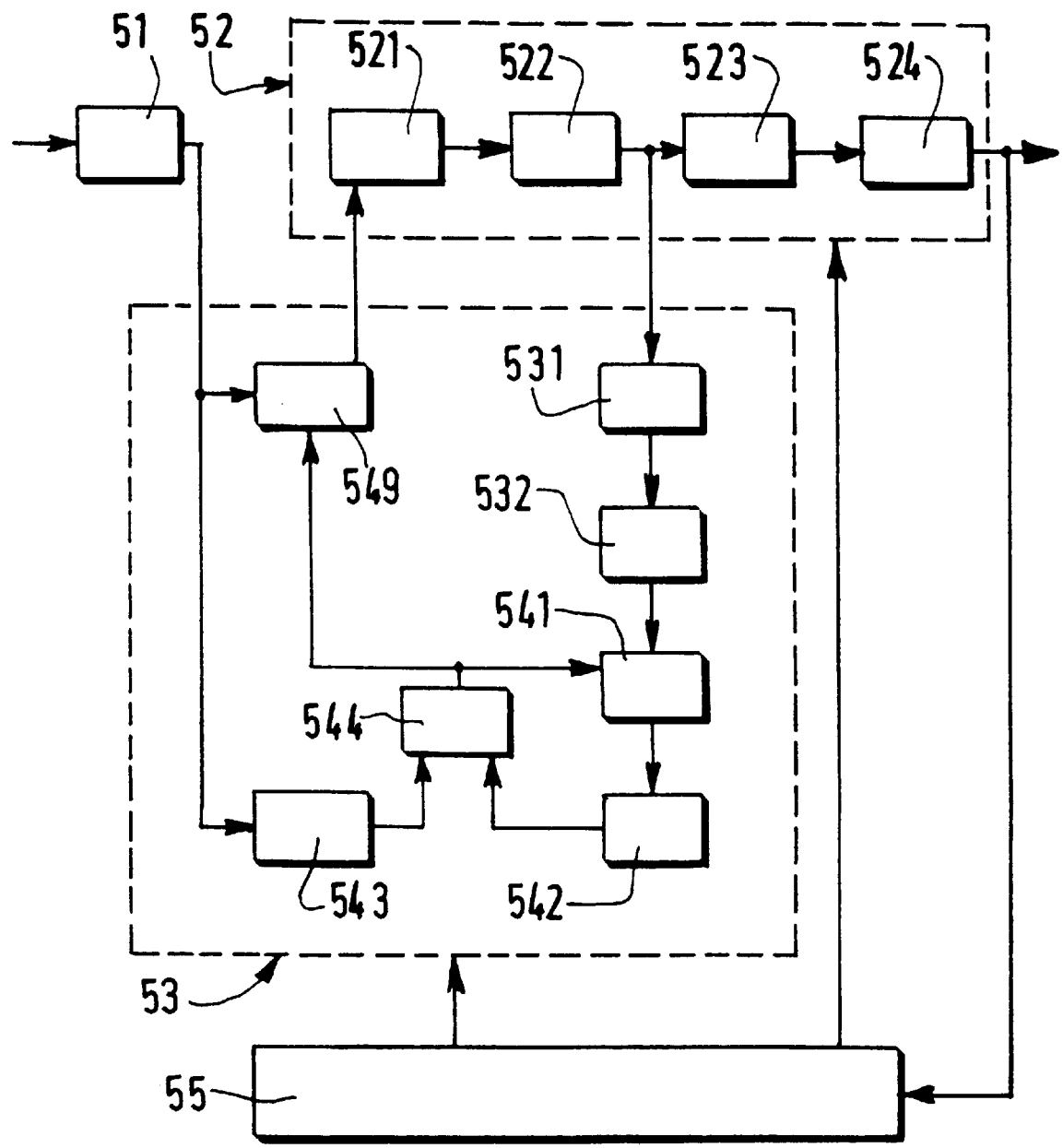
FIG. 6 shows a control loop used for the implementation of the final control step of said coding method.

The output of the illustrated coder is sent towards the controller 55 that includes the control loop provided to carry out the final step 43. The main elements of said control loop for the final pass of the VBR coder are shown in FIG. 6. As already explained, it is necessary to adjust the quantization stepsize during this final coding pass, in order to ensure that the total target bit rate given by the operator is exactly matched. Said loop first comprises a first computation circuit 61 in which the output of the loop (i.e. the cumulative prediction error) is multiplied by a factor KP. This factor is itself equal to a constant $QC_1$ (chosen by the operator) multiplied by a weighting factor $Q_{int}$/APG, where $Q_{int}$ is an integrative estimation of Q and APG the total number of bits for a GOP (of N frames).

An adder 63 then adds the output Q-prop of said circuit 61 and the signal $Q_{int}$, available at the output of a second computation circuit 62 provided for yielding an integrative estimation of Q. A conversion circuit 64 gives the cumulative bitrate for all preceding frames, on the basis of a relation $R=f_i(Q)$ (between the quantization factor Q at the output of the adder 63 and R) stored in said circuit 64. The cumulative bitrate thus obtained is compared in a comparator 65 with the cumulative predicted bitrate available on a second input of said comparator and is used, after an integration in a circuit 66, in order to modify Q accordingly.

The VBR coding strategy as presented above is an improvement with respect to previous VBR coders because it achieves a better equalization of the perceptive quality of the decoded sequence. The classical VBR coders adjust the quantization parameter Q while coding a frame, so that the predicted bit rate is matched for every picture. Hence they allow the quantization parameter Q to vary inside a frame, and no constant spatial quality of the picture can be achieved. This variation in quality occurs whether the bit rate of the frame is correctly predicted or not. For the proposed VBR coder, Q is kept constant over a frame and the spatial quality of any picture in the video sequence does not vary. If the frame bit rates and the quantization stepwidth are correctly estimated, the Q before adaptive quantization, and therewith the subjective distortion, remains exactly constant for all macroblocks of the sequence. Since the quantization stepwidth and the frame bit rates are only estimated, a variation of Q, and hence of the quality of the sequence, occurs from frame to frame, but, after two analysis passes, the deviations of Q, averaged over a frame, are generally below 1%.

Apart from the attainment of a constant intra-frame quality, several other important aspects of the new VBR strategy may be mentioned:

it is possible to improve the prediction of the quantization factor in an iterative way by increasing the number of analysis passes: if, after the analysis run, the deviation from the wanted target bit rate is still too high, a better estimation for the quantization factor can be calculated using the results from the previous coding passes;

as the new VBR coding strategy predicts Q, analysis passes that are performed with another frame order than the predicted pass can be exploited: this is impossible using old strategies, and this is a major advantage of the new coding concept;

if, in the final pass, the variations of Q and consequently of the quality turn out to be unacceptably high, the final step can be used as an analysis pass for the prediction of Q and of the bitrate for the subsequent pass: using this feature, it is possible to develop a coder that performs as many coding passes as needed until the characteristics of the output bitstream are within certain limits defined by the operator;

as the control loop has an integrative character, short-term bit rate prediction errors cancel each other out: therefore, systematic, frame-type dependent prediction errors do not seriously affect the performance of the proposed VBR coder.

What is claimed is:

1. A variable bitrate video coder characterized in that it comprises:
    (a) a coding branch, including in series at least a quantization circuit and a variable length circuit;
    (b) a prediction branch, including in series at the output of said quantization device at least an inverse quantization device and a prediction sub-system and defining by subtraction the signal to be coded by said coding branch;
    (c) a control circuit provided for carrying out the implementation of the following operations:
        a coding operation of a video sequence with quantization stepsize to generate a bitstream including frames;
        a prediction operation for an estimation of the quantization stepsize to code the bitstream according to a specified target bitrate;
        at least one repetition of said operations;
        a controlling operation for modifying the quantization stepsize based on comparing if a total number of bits utilised during the coding operation matches said target bitrate.

2. A variable bitrate video coding device according to claim 1, characterized in that said controlling operation is carried out by means of a control loop for modifying said stepsize according to the result of a comparison between a cumulative bitrate for all previous frames and a cumulative predicted bitrate.

* * * * *